Oct. 1, 1935.    F. PEUKER ET AL    2,016,098
AUTOMATIC SCALE
Filed Sept. 18, 1933    3 Sheets-Sheet 1
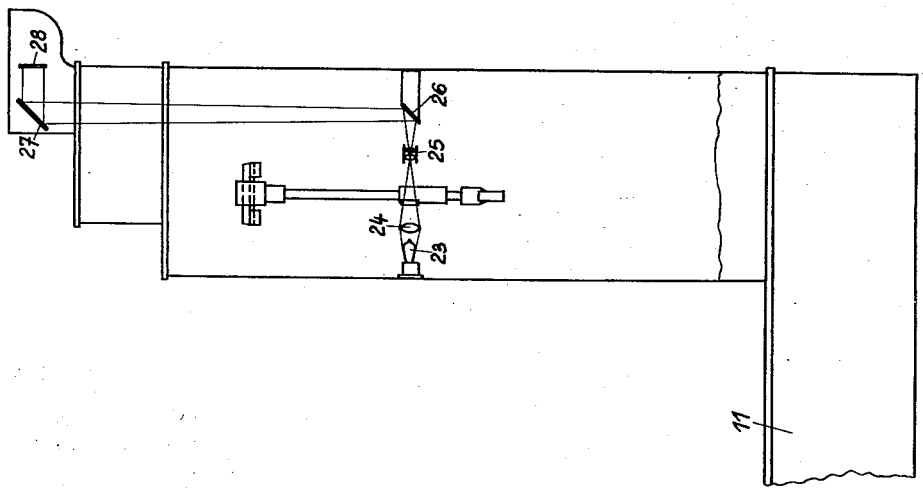
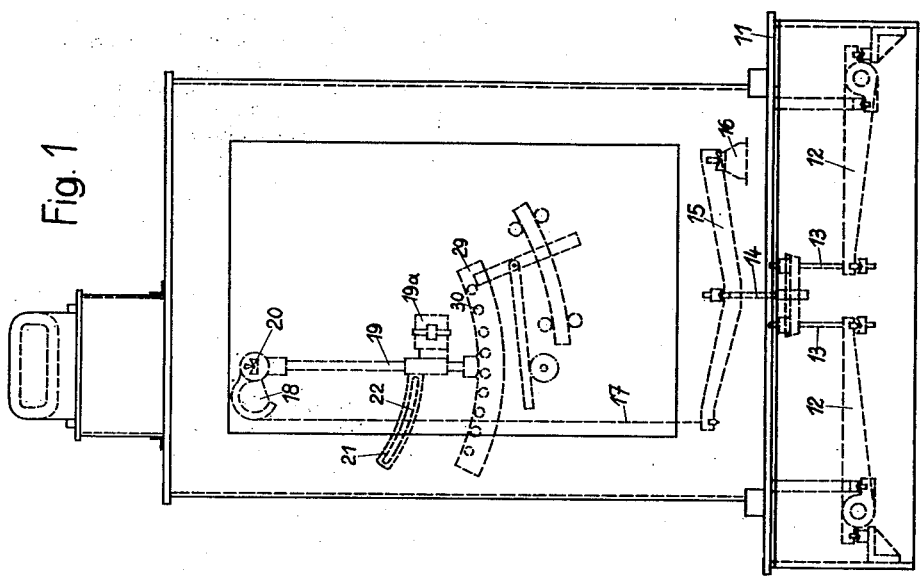
Inventors Frank Peuker
Kurt Rathke

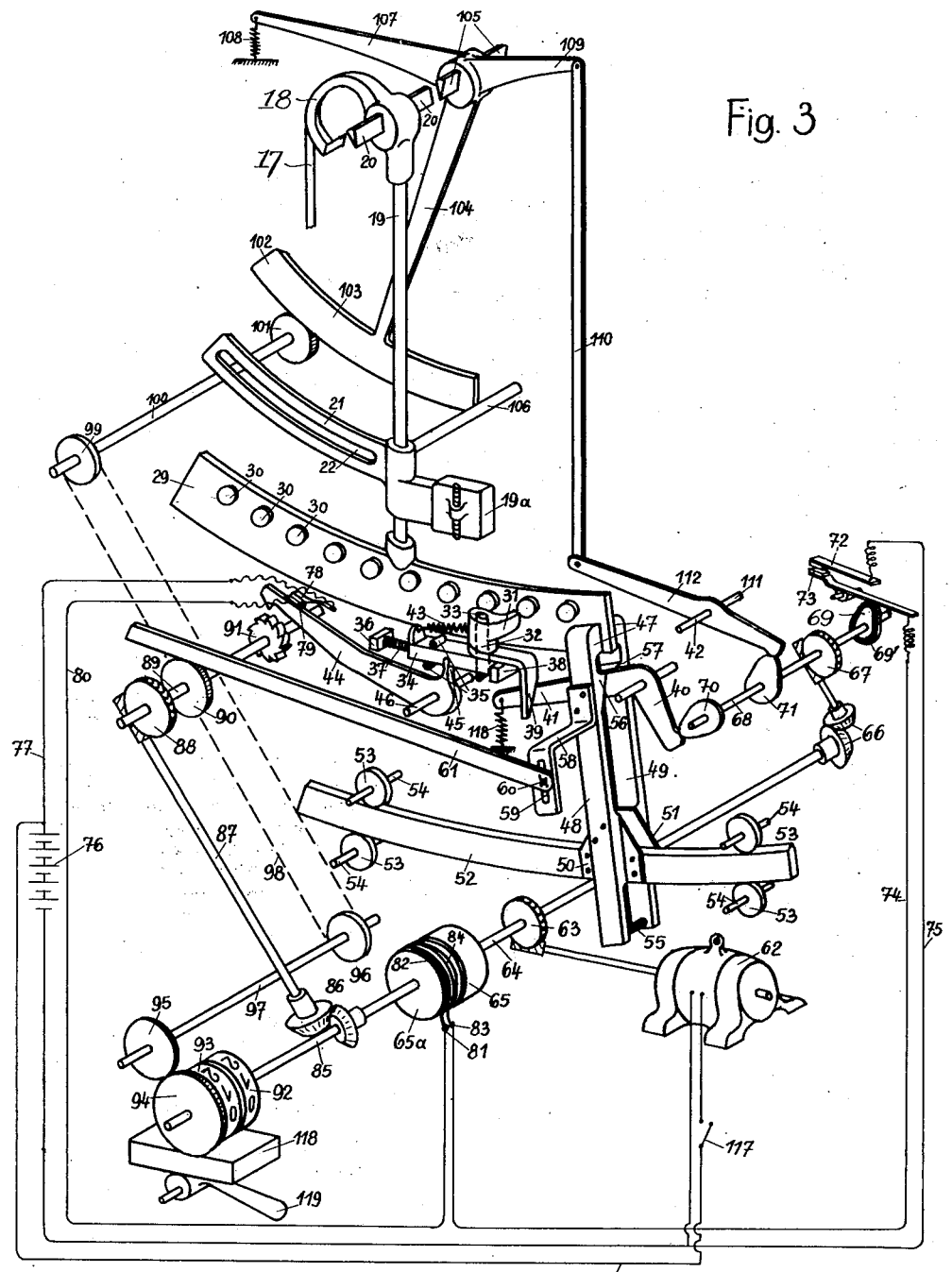

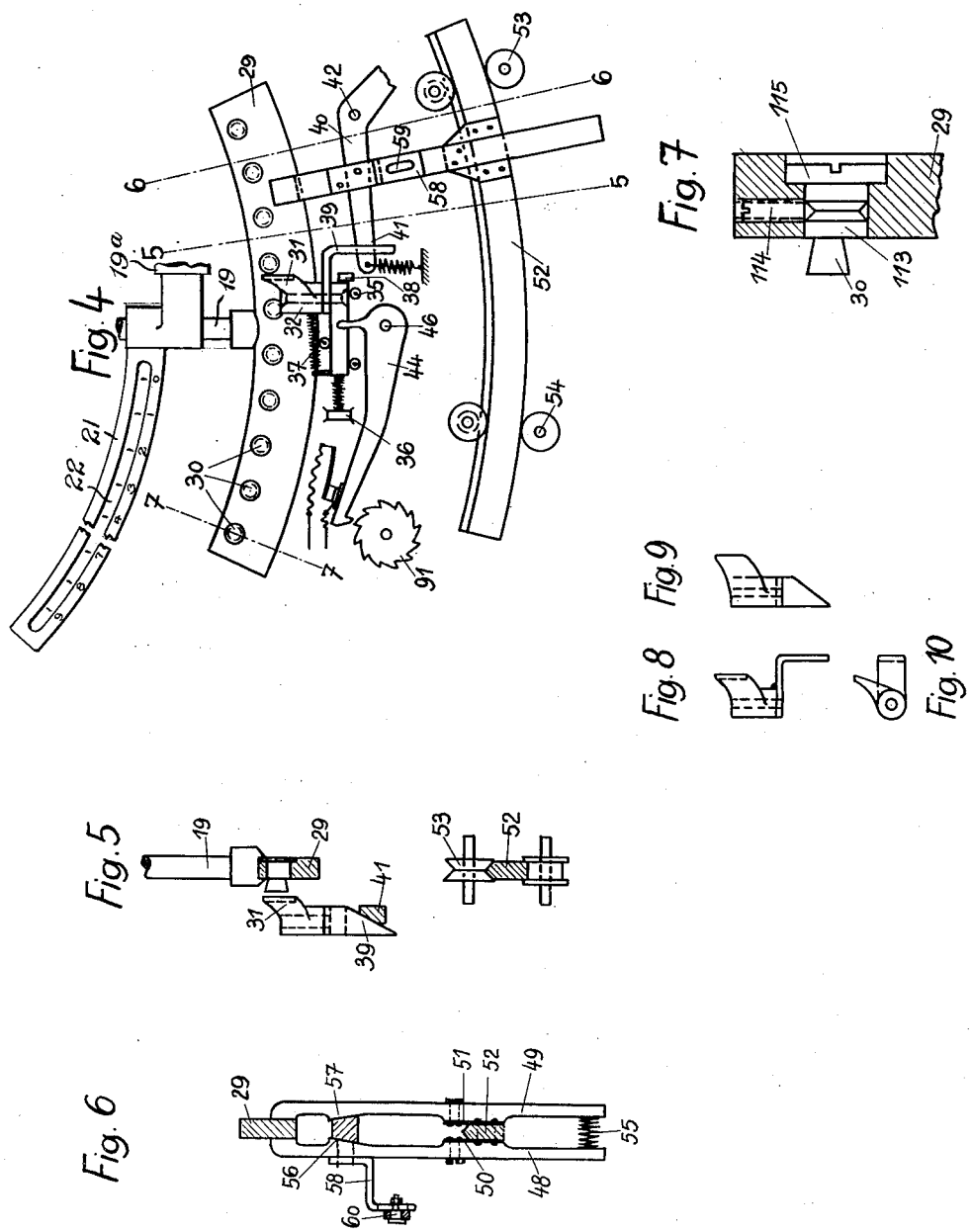

Patented Oct. 1, 1935

2,016,098

UNITED STATES PATENT OFFICE 2,016,098

AUTOMATIC SCALE

Franz Peuker and Kurt Rathke, Darmstadt, Germany, assignors to Carl Schenck Eisengiesserei & Maschinenfabrik Darmstadt, G.m.b.H., Darmstadt, Germany Application September 18, 1933, Serial No. 689,946
In Germany September 19, 1932

12 Claims. (Cl. 265—5)

This invention relates to automatic scales, in which the weight of the load applied to the weighbridge is indicated on a graduated scale, and transmitted to a printing device printing the weighing result on a ticket. Quite particularly this invention relates to automatic scales of this kind, in which the inclination of the pendulum is transmitted to the printing device in the manner described in the pending application of Karl Diehl, Ser. No. 584,208, filed December 31, 1931. This transmission is essentially performed by a lever connected up to the pendulum; this lever being provided with a number of equally spaced stops arranged according to a given sub-division of the total weighing range. After having been adjusted through the influence of the load, the pendulum is moved back until one of the stops comes in touch with a pawl. This backward movement is transferred to the type wheels for recording the lower orders, while the type wheels of the higher orders are directly adjusted by the inclination of the pendulum.

With all these automatic scales it is extraordinarily difficult to bring the indication of the weighing result on the graduated scale into such a conformity with the result of the printing device that both give exactly one and the same value. This is particularly difficult with scales in which indication is made visible through the optical enlargement of a graduated scale connected with the pendulum. Such graduated scales must beforehand be manufactured on the basis of the optical system; consequently, while assembling, they cannot be altered and adapted to the result of the printing device.

The object of the invention is to provide means securing in said scales an exact conformity between the values indicated and to be recorded. These means consist in the stops at the transmitting elements being adjustable separately according to the appurtenant scale values.

Another object of the invention is to provide an adjustable mechanism at another transmitting element by means of which the ratio between the printing device and the division of the scale is so adjusted that the two values exactly coincide in this respect.

A further object of the invention is to provide appropriate devices for transmitting the backward movement of the pendulum to the printing device; said devices consisting of the elements performing the movement and the pertaining controllers releasing and stopping this movement.

Further objects and advantages will be apparent from the following description in which reference is had to the accompanying drawings in which Fig. 1 shows a front elevation of the whole scale, the main parts of the interior being indicated in dotted lines to demonstrate the assembling, Fig. 2 shows a side elevation with the cover of the housing partially removed to show especially the optical equipment for the enlargement of the weight indication, Fig. 3 is a perspective view of all parts according to the invention. For more clearness, the bearings and the housing of the scale have been omitted, Fig. 4 is a partial front view of the parts shown in Figure 3, Fig. 5 is a vertical sectional view of the parts shown in Figure 4, the sectional view being taken on line 5—5, Fig. 6 is another sectional view of the parts shown in Figure 4, the sectional view being taken on line 6—6, Fig. 7 is a sectional view taken on line 7—7 of Figure 4 and shows essentially the stops on the pendulum and their adjustability, Figs. 8, 9 and 10 show in enlarged scale the front elevation, side elevation and top view of the pawl limiting the motion of the pendulum.

The load is put on the weighbridge 11 and its weight is transmitted by means of the levers 12, the rods 13 and 14, to an intermediate lever 15, supported in a bearing 16 and acting, with its other end, upon a belt 17, lying on a curve plate 18. This curve plate is rigidly connected to the pendulum 19 supported on a bearing 20 and carrying the weight 19a with an adjustable auxiliary weight. The load applied to the weighbridge cause an inclination of the pendulum 19 corresponding to the weight.

An arm 21 is fitted to the pendulum and carries a transparent graduated scale 22 with corresponding numerals.

From an electric lamp 23 light is projected through the condensing lens 24, through transparent scale 22, through lenses 25, and after having been inversed by mirrors 26—27, onto the screen 28. As the pendulum and the scale adjust themselves according to the weight, the latter becomes visible on said screen.

A lever 29 is fitted to the pendulum 19, carrying stops 30. The stops cooperate with a pawl 31, when the latter is engaged. The pawl 31 is carried on a nave 32 pivotally mounted upon a shaft 33. The latter is situated upon a guided piece, or slide 34 movable on the rollers 35 and normally pressed against an abutment 38 of the housing by means of a spring 37, supported at one end on a lug 36 of the housing. An arm 39 is also fixed to the nave 32 and is bent downwards and bevelled at its lower edge. This bevelled edge engages a bevelled portion 41 of a double lever 40. As soon as the double lever 40 carried on the pivot 42 is rocked so that its left end moves, it presses the bevelled portion of the arm 39 sidewards, thereby turning to the right the nave 32 and the pawl 31 fixed thereon. Then the pawl 31 is brought into a position so as to render it impossible for it to reach the stops 30, even in the event of the arm 29 being moved. However, if the left end of the double lever 40 moves downwards, the pawl 31 is turned counterclockwise again due to the traction of the spring 43. In this way the pawl 31 strikes against the next following stop 30 when the pendulum 19 and the lever 29 are in motion, whereupon the motion of the pendulum ceases.

As soon as such a striking of the pawl against one of the stops occurs, the slide 34 is somewhat displaced against the pressure of the spring 37. The pawl 44 connected with a short lever 45 and pivotally carried upon the shaft 46 then drops into a ratchet wheel 91.

Adjacent to the lever 29, a coupling device 47 in the shape of tongs is guided so that it moves on an arc about the axis 20 of the knives of the pendulum. For this purpose the two legs of the pair of tongs 48 and 49 are each connected with resilient plates 50 and 51 fixed on an arcuate bar 52. Said bar is carried in rollers 53 rotatably mounted on fixed axes 54. On account of the bar being arcuate, same will, together with the coupling device 47, be guided on said arc. The mounting of the legs of the pair of tongs by means of resilient plates procures them a certain movability. The tongs' mouth can then be opened and closed. This is effected by means of the pressure spring 55 tending to close the tongs and by the already mentioned double lever 40, partially arranged in the shape of a wedge which opens them. The wedge-shaped portion of the double lever engages between the two salient wedges 56, 57 of the coupling device 47. When, on rising said double lever presses the salient wedges apart and therewith the legs of the tongs, the coupling device is released. However, when the wedge-shaped portion of the double lever 40 moves downwards, the spring 52 closes the tongs' mouth. Then the latter presses against the lever 29 and consequently it can only move together with same.

Laterally on one leg 48 of the tongs a bracket 58 is fixed having a slot 59 in which is adjustably secured a bolt 60 to which is connected a toothed rack 61. This toothed rack engages in a toothed wheel 90 with which it cooperates in a manner fully described later on.

The remaining parts consist of the motor 62 transmitting its rotation by a worm gear 63 to the shaft 64. On this shaft is located a part of a magnetic coupling 65 and a bevel wheel gear 66. From the latter the rotation is passed to another worm gear 67 which drives the shaft 68; on the latter are located cam discs 69, 70 and 71.

The disc 69 actuates a contact device consisting of a fixed contact piece 72 and another contact piece 73 arranged on a spring. The contact pieces are electrically connected with the lines 74 and 75. To prevent the current from being conducted into the transmitting gear of the scale, the disc 69 is provided at its outer border with a ring 69' made of insulating material.

The line 75 leads to one pole of a source of current 76, the other pole of which is connected with the line 77 leading to a contact piece 78. This contact piece is resilient to some extent and cooperates with the contact piece 79 fixed to the pawl 44, but insulated from it. The contact piece 79 is connected by the line 80 with a slip contact 81 slipping upon a slip ring 82 of the part 65a of the magnetic coupling 65. Another slip contact 83 slipping upon the slip ring 84 of the same part of the magnetic coupling is connected with the line 74.

If both the contact pieces 72 and 73, and the contact pieces 78 and 79 are in contact, current is flowing through said line to the magnetic coupling, thereby engaging same. In consequence thereof the rotation of the shaft 64 is transmitted to the shaft 85. As soon as one of said contacts is opened, the current is switched off, thereby disengaging the magnetic coupling 65 so that the shaft 65 comes to rest, even if the shaft 64 continues to rotate.

A bevel wheel gear is located on a shaft 85 and is connected, by means of a shaft 87, with a worm gear 88 so as to turn the shaft 89, if shaft 85 is in rotation. Besides the worm gear a toothed wheel 90 and a ratchet wheel 91 are fixed on the shaft 89. The shaft 85 drives a disc 92, fitted with types for printing the numerals of the lower orders of the weighing result.

On the other hand, the numerals of the higher orders are printed by means of a disc 93, also fitted with types. This disc 93 is loose on shaft 85 and has fixed to it a pinion 94 meshing with a pinion 95 fixed on a shaft 97. The shaft 97 is driven by the chain wheel 96 and the latter by the chain 98. The chain wheel 99 is located on the shaft 100 together with the toothed wheel 101, which drives the chain wheel 99 and therewith the chain 98. Said toothed wheel 101 engages in a toothed arc 102, fixed on a segment 103. The latter is a part of the pendulum 104, which is pivotally carried in bearings 105. The axis of these bearings coincides with the axis of the knives 20 of the pendulum 19. An arm 106 serves as a stop for the segment 103. A double lever is fixed to the pendulum 104, the arm 107 of which is drawn downwards by a spring 108, while the other arm 109 cooperates, by means of a rod 110 and the double lever 112 rotatable about the fixed axis 111, with the cam disc 71.

For the purpose of bringing the mechanism transmitting the motion of pendulum 19 to the printing device, into exact conformity with the indication of the scale 22 visible at the screen 28, the stops 30 are adjustable with respect to the lever 29. The means for effecting this adjustment are shown in Fig. 7. Each of the stops 30 is eccentrically fixed to a bolt 113, the latter being rotatably inserted in a bore of the lever 29. The head at the other end of the bolt has a slot to enable the bolt to be turned. If it is necessary to displace the position at which the lever 29 is stopped by engagement of one of the stops 30 with the pawl 31, the bolt 113 is turned, so that the eccentrically arranged stop changes its position in respect to the lever 29. As soon as the correct position is reached, a screw 114 is screwed against a groove in the bolt 113 for locking it in its position.

On the other hand the bolt 60 will be displaced in the slot 59, if it is necessary to adjust not only an individual stop, but all of the stops in such a manner, that the ratio between the motion of the pendulum and the rotation of the type-wheel is enlarged or diminished. Through this displacement the distance between the bolt 60 and the axis of the pendulum 19 is changed, so that the movement of the toothed rack 61 becomes greater or smaller, for a given movement of the pendulum 19. The toothed rack being in connection with the type-wheel, the rotation of same changes, too.

The above mentioned motor 62 is driven by the source of current 76, connected with same by the lines 75 and 116. A lever switch 117 is intercalated in the line 116 for opening and closing the circuit.

The weighing process takes place in the following manner:

First the left arm of the double lever 40 with its wedge-shaped portions is in a lifted position; thereby the coupling device 47 is opened and the pawl 31 brought into its correct position against the traction of the spring. Thus the pendulum 19 is free to swing out. As soon as the load has been put onto the weighbridge and when the pendulum has come at rest with a certain inclination, the switch 117 is closed. The motor 62 and the shaft 64 rotate, but the shaft 85 remains at rest, for in the first instance, the magnetic coupling 65 is disengaged, the appurtenant contact-pieces being not engaged.

By means of the transmitting elements between the shafts 64 and 68, the latter is also moved at a very low speed. Thus, after a short time, the cam disc 70 reaches a position, so as to release the double lever 40, which then follows the traction of a spring 118 fixed to the housing. Simultaneously the tongs will become free of the pressure of the wedge-shaped portion of the lever 40, so that the spring 55 presses the mouth of the tongs together, whereby the tongs are connected with the lever 29. At the same time, the pawl 31 is turned counterclockwise by the releasing of the bevelled surface 41 and through the action of the spring 43. Thus the pawl is brought into the path of the adjacent stop 30.

After all these proceedings have been performed, the cam disc 69 presses the resilient contact piece 73 against the contact 72, for the shaft 68 continues to turn. As long as the contact pieces 78 and 79 are in contact, too, the circuit, in which is intercalated the magnetic coupling 65, is closed. In this way said coupling is engaged and the shafts 64 and 85 connected to each other. By the rotation of the last named shaft, the type-wheel 92, on the one hand, and the toothed wheel 90, on the other hand, are turned; the latter through transmission of the movement over the elements 86, 87 and 88. In consequence thereof, the toothed rack 61 is moved and in conjunction with same the coupling device 47 and the lever 29 connected with the latter. Said movement lasts until the next following stop 30 strikes against the pawl 31.

Thus is performed, what has briefly been mentioned above; viz. the pawl 31 and the parts connected with same, hence also the slide 34, will be moved somewhat on striking. At the same moment, the pawl 44 drops into the ratchet wheel 91, for simultaneously with the movement of the slide 34 also the short lever 45 was moved. The further movement of the parts 85—90 is thus blocked as well as the movement of the type-wheel 92.

To avoid damage in this blockage, the contact pieces 78 and 79 are separated, while the lever 44 is dropping, so that the current, which passes through the magnetic coupling 65, is interrupted. Thus the two shafts 64 and 85 are also disengaged.

The above mentioned process has the result that the rotation of the type-wheel 92 corresponds to the partial backward motion of the pendulum up to the next following stop, but on an enlarged scale. If the stops 30 are arranged as described in the aforesaid pending application Ser. No. 584,208, and if they are adjusted, in conformity with the sub-divisions of the graduated scale 22, as described above, the rotation of the type-wheel 92 corresponds to the weighing result in the lower orders. Thereby the types of said type-wheel are placed, so as to print the correct weighing result of the same orders.

The setting of the printing members of the higher orders of the weighing result is effected by the pendulum 104. While the load is put onto the weighbridge and the pendulum 19 is swinging out, said pendulum 104 is held by the cam disc 71 in such a position, that the pendulum 19 is not influenced by it. As soon as the pendulum 19 has come to rest, the disc 71 releases the pendulum 104, which is then turned counterclockwise by the traction of the spring 108. The segment 103 thus striking against the arm 106 stops said turning motion, so that the latter corresponds to the inclination of the pendulum 19. The segment 103 being, through the toothed arc 102, the toothed wheel 101, the pinions 94 and 95, in connection with the type-wheel 93, the latter is turned in conformance with the motion of the segment 103. In this manner the type-wheel 93 is turned according to the inclination of the pendulum 19 for the printing of the weighing result of the higher orders. The above mentioned backward motion of the pendulum 19 is also transmitted by said elements so as to bring the type-wheel 93 into the correct printing position.

After the type-wheels 92 and 93 have been properly placed, a ticket is introduced into the slot between the type-wheels and a printing plate 118 and the printing plate is pressed against said wheels, so as to print the total weighing result.

After the performance of the weighing process, the motor 62 continues to run and drives the shaft 68; by the simultaneously rotating cam disc the resilient contact piece 73 is no longer pressed against the contact piece 72, and thus the appurtenant circuit is interrupted. Thereafter it is no longer possible for the magnetic coupling between the shafts 64 and 65 to engage, even if the contact pieces 78 and 79 come in touch.

By further rotation of the same shaft 68 and of the cam disc 70, the left-hand portion of the double lever 40 is moved upward again, thereby removing the coupling device 47 from the lever 29 through the wedge-shaped portion on the arm 40, on the one hand, and turning back again the pawl 31 by lifting the bevelled surface 41 on the arm 40, on the other hand, so as to render it impossible for the pawl 31 to engage the stops 30. Now the slide 34 is allowed to follow the pressure of the spring 37, thereby permitting said slide to move to the right, whereby the pawl 44 is removed from the ratchet wheel 91.

Finally the double lever 112 is turned through the action of the cam disc 71, rotating likewise with the shaft 68. In this way the double lever 112 leads, by means of the rod 119, returns the pendulum 104 with the segment 103 to their initial position. Thereafter the switch 117 is opened again and the scale thus ready for a new weighing process.

The embodiments of our invention herein shown and described are to be regarded as illustrative only, and it is to be understood that the invention is susceptible of variation, modification and change within the spirit and scope of the subjoined claims.

Having described our invention, we claim:

1. In a weighing scale for indicating and printing weighing results by numerical values of a plurality of orders, a pendulum, the inclination of which corresponds to the load on the weighbridge; an arcuate arm with a graduated scale, connected with said pendulum and moving with it, so as to indicate the weight; an arcuate lever, also connected with said pendulum and moving with it; a number of stops on said lever; a pawl movable into and out of the path of said stops, said stops corresponding in position to major graduations of said scale and being adjustable upon said lever to make them coincide with said major graduations; means for moving said pawl into the path of an adjacent stop after said pendulum has assumed its definitive position; a coupling device acting in coupled state upon a part connected with said pendulum; a printing member actuated by the coupling device and provided with printing types for printing the lower orders of the weighing result; another printing member for printing the higher orders of the weighing result; and means for setting said higher order printing member in accordance with the inclination of said pendulum.

2. In a weighing scale for indicating and printing weighing results by numerical values of a plurality of orders, a pendulum, the inclination of which corresponds to the load on the weighbridge; an arcuate arm with a graduated scale, connected with said pendulum and moving with it, so as to indicate the weight; an arcuate lever, also connected with said pendulum; a friction coupling device adapted to engage said arcuate lever; a guiding bar, guiding said coupling device on a definite path adjacent to said arcuate lever and conforming to the motion of said lever, whereby said lever and coupling device move together when coupled; a toothed rack pivotally connected with said coupling device; a pinion engaged by said rack, a printing member for printing the lower orders of the weighing result, said printing member being connected with said pinion and moving with same; another printing member for printing the higher orders of the weighing result; and means for setting said higher order printing member in accordance with the inclination of said pendulum.

3. In a weighing scale for indicating and printing weighing results by numerical values of a plurality of orders, a pendulum, the indication of which corresponds to the load on the weighbridge; an arcuate arm with a graduated scale, connected with said pendulum and moving with it so as to indicate the weights; an arcuate lever also connected with said pendulum; a coupling device adapted to engage said arcuate lever in the shape of tongs, with a wedge-like part on each arm; a wedge cooperating with said wedge-like parts to force the tongs apart; a spring pressing the arms of said tongs together; a guiding bar, guiding said coupling device on a definite path adjacent to said arcuate lever and conforming to the motion of said lever, whereby said lever and coupling device move together when coupled; a toothed rack pivotally connected with said coupling device; a pinion engaged by said rack; a printing member for printing the lower orders of the weighing result connected with said pinion and moving with same; another printing member for printing the high orders of the weighing result; and means for setting said higher order printing member in accordance with the inclination of said pendulum.

4. In a weighing scale for indicating and printing weighing results by numerical values of a plurality of orders, a pendulum, the inclination of which corresponds to the load on the weighbridge; an arcuate arm with a graduated scale, connected with said pendulum and moving with it so as to indicate the weight; an arcuate lever also connected with said pendulum; a coupling device adapted to engage said arcuate lever in the shape of tongs, with a wedge-like part on each arm; a wedge cooperating with said wedge-like parts to force the tongs apart; a spring pressing the arms of said tongs together; a guiding bar guiding said coupling device round the knife-axis of said pendulum to cause said coupling device to move along an arc near said lever, so as to allow said coupling device to be clamped thereon and to move in conjunction with said pendulum; a toothed rack pivotally connected with said coupling; a pinion engaged by said rack; a printing member for printing the lower orders of the weighing results connected with said pinion and moving with same; another printing member for printing the higher orders of the weighing result; and means for setting said higher order printing member in accordance with the inclination of said pendulum.

5. In a weighing scale for indicating and printing weighing results by numerical values of a plurality of orders, a pendulum, the inclination of which corresponds to the load on the weighbridge; an arcuate arm with a graduated scale, connected with said pendulum and moving with it so as to indicate the weight; an arcuate lever also connected with said pendulum; a coupling device adapted to engage said arcuate lever, in the shape of tongs, with a wedge-like part on each arm; a wedge cooperating with said wedge-like parts to force the tongs apart; a spring pressing the arms of said tongs together; a guiding bar guiding said coupling device round the knife-axis of said pendulum, to cause said coupling device to move along an arc near said lever, so as to allow said coupling device to be clamped thereon and to move in conjunction with said pendulum; a bolt adjustable in a slot of said coupling device, said slot extending outward from the axis of said pendulum; a toothed rack pivotally connected with said bolt, thus allowing them to move together with the coupling device, a pinion driven by said rack; a printing member for printing the lower orders of the weighing result connected with said pinion and movable with same, the motion of said toothed rack and said printing member being larger or smaller in comparison to the motion of said arcuate lever, according to the adjustment of said bolt in said slot; another printing member for printing the higher orders of the weighing result; and means for setting said higher order printing member in accordance with the inclination of said pendulum.

6. In a weighing scale for indicating and printing weighing results by numerical values of a plurality of orders, a pendulum, the inclination of which corresponds to the load on the weighbridge; an arcuate arm with a graduated scale, connected with said pendulum and moving with it, so as to indicate the weight; an arcuate lever, also connected with said pendulum and moving with it; a number of stops on said lever; a pawl movable into and out of the path of said stops, said stops corresponding in position to major graduations of said scale and being adjustable upon said lever to make them coincide with said major graduations; means for moving said pawl into the path of an adjacent stop after said pendulum has assumed its definitive position; a coupling device adapted to engage said lever; a guiding bar, guiding said coupling device on a definite path adjacent to said lever and conforming to the motion of said lever, whereby said lever and coupling device move together when coupled; a toothed rack pivotally connected with said coupling device; a pinion engaged by said rack; a printing member for printing the lower orders of the weighing result connected with said pinion and movable with same; another printing member for printing the higher orders of the weighing result; and means for setting said higher order printing member in accordance with the inclination of said pendulum.

7. In a weighing scale for indicating and printing weighing results by numerical values of a plurality of orders, a pendulum, the inclination of which corresponds to the load on the weighbridge; an arcuate arm with a graduated scale, connected with said pendulum and moving with it, so as to indicate the weight; an arcuate lever, also connected with said pendulum and moving with it; a number of stops on said arcuate lever; a pawl adapted to be moved into and out of the path of said stops, said stops corresponding in position to major graduations of said scale and being adjustable upon said lever to make them coincide with said major graduations; means for moving said pawl into the path of an adjacent stop after said pendulum has reached its definitive position; a coupling device adapted to engage said arcuate lever in the shape of tongs, with a wedge-like part on each arm; a wedge cooperating with said wedge-like parts to force the tongs apart; a spring pressing the arms of said tongs together; a guiding bar guiding said coupling device on a definite path adjacent to the arcuate lever and conforming to the motion of said lever, whereby said lever and coupling device move together when coupled; a toothed rack pivotally connected with said coupling device; a pinion engaged by said rack; a printing member for printing the lower orders of the weighing result, connected with said pinion and moving with same; another printing member for printing the higher orders of the weighing result; and means for setting said higher order printing member in accordance with the inclination of said pendulum.

8. In a weighing scale for indicating and printing weighing results by numerical values of a plurality of orders, a pendulum, the inclination of which corresponds to the load on the weighbridge; an arcuate arm with a graduated scale, connected with said pendulum and moving with it, so as to indicate the weight; an arcuate lever, also connected with said pendulum and moving with it; a number of stops on said arcuate arm; a pawl adapted to be moved into and out of the path of said stops, said stops corresponding in position to major graduations of said scale and being adjustable upon said lever to make them coincide with said major graduations; means for moving said pawl into the path of an adjacent stop after said pendulum has reached its definitive position; a coupling device adapted to engage said arcuate arm in the shape of tongs, with a wedge-like part on each arm; a wedge cooperating with said wedge-like parts to force the tongs apart; a spring pressing together the arms of said tongs; a guiding bar guiding said coupling device round the knife-axis of said pendulum, to cause said coupling device to move along an arc near said lever, so as to allow said coupling device to be clamped thereon and to move in conjunction with the pendulum; a toothed rack pivotally connected with said coupling device; a pinion engaged by said rack; a printing member for printing the lower orders of the weighing result, connected with said pinion and moving with same; another printing member for printing the higher orders of the weighing result; and means for setting said higher order printing member in accordance with the inclination of said pendulum.

9. In a weighing scale for indicating and printing weighing results by numerical values of a plurality of orders, a pendulum, the inclination of which corresponds to the load on the weighbridge; an arcuate arm with a graduated scale, connected with said pendulum and moving with it, so as to indicate the weight; an arcuate lever also connected with said pendulum and moving with it; a number of stops on said arcuate arm; a pawl adapted to be moved into and out of the path of said stops, said stops corresponding in position to major graduations of said scale and being adjustable upon said lever to make them coincide with said major graduations; means for moving said pawl into the path of an adjacent stop after said pendulum has reached its definitive position; a coupling device adapted to engage said arcuate arm in the shape of tongs, with a wedge-like part on each arm; a wedge cooperating with said wedge-like parts to force the tongs apart; a spring pressing together the arms of said tongs, a guiding bar guiding said coupling device round the knife-axis of said pendulum, to cause said coupling device to move along an arc near said lever, so as to allow said coupling device to be clamped thereon and to move in conjunction with the pendulum; a bolt adjustable in a slot of said coupling device; a pinion driven by said rack; a printing member for printing the lower orders of the weighing result connected with said pinion and movable with same, the motion of said toothed rack and said printing member being larger or smaller in comparison to the motion of said arcuate lever, according to the adjustment of said bolt in said slot; another printing member for printing the higher orders of the weighing result; and means for setting said higher order printing member in accordance with the inclination of said pendulum.

10. In a recording scale comprising a pendulum which tilts through an angle corresponding to the weight of the load; an indicating scale movable by said pendulum divided into major graduations and fractions thereof; a member movable by said pendulum bearing stops spaced on said member in accordance with the spacing of said major graduations; a pawl movable into and out of the path of said stops; means for moving said pawl into the path of an adjacent stop after said pendulum has reached its definitive position; a printing member for recording the fractions of said major graduations; means to connect said printing and stop bearing members together; means for moving said members when connected until they are stopped by abutment of one of said stops against said pawl; said stops being adjustably mounted upon said stop bearing member to permit the setting of said printing member to be made to conform with said indicating means.

11. A recording scale as described in claim 10, wherein the means to connect said printing and stop bearing members together comprise a friction coupling device adapted to clamp upon an element connected with said pendulum.

12. In a recording scale comprising a pendulum which tilts through an angle corresponding to the weight of the load; an indicating scale movable by said pendulum divided into major graduations and fractions thereof; a member movable by said pendulum bearing stops spaced on said member in accordance with the spacing of said major graduations; a pawl movable into and out of the path of said stops; means for moving said pawl into the path of an adjacent stop after said pendulum has reached its definitive position; a printing member for recording the fractions of said major graduations; means to connect said printing and stop bearing members together; means for moving said members when connected until they are stopped by abutment of one of said stops against said pawl; said means to connect said printing and stop bearing members together comprising gearing enforcing a definite ratio of motion of said printing member to said stop bearing member, and means to adjust said ratio.

FRANZ PEUKER.
KURT RATHKE.